(12) United States Patent
Lin

(10) Patent No.: US 7,084,889 B2
(45) Date of Patent: Aug. 1, 2006

(54) DIGITAL PICTURE SCALING

(75) Inventor: Wen-Kuo Lin, Taipei (TW)

(73) Assignee: Silicon Integrated Systems Corp., Hsin-Chu (TW)

( * ) Notice: Subject to any disclaimer, the term of this patent is extended or adjusted under 35 U.S.C. 154(b) by 127 days.

(21) Appl. No.: 10/605,745

(22) Filed: Oct. 23, 2003

(65) Prior Publication Data

US 2005/0088459 A1    Apr. 28, 2005

(51) Int. Cl.
  *G09G 5/00*  (2006.01)
  *G06K 9/42*  (2006.01)
  *G06K 9/44*  (2006.01)
  *G06K 9/40*  (2006.01)

(52) U.S. Cl. .................. 345/660; 345/668; 345/669; 382/256; 382/260

(58) Field of Classification Search ......... 345/660–671
See application file for complete search history.

(56) References Cited

U.S. PATENT DOCUMENTS

| | | | |
|---|---|---|---|
| 6,591,011 B1 * | 7/2003 | Nielsen ...................... 382/218 |
| 6,600,514 B1 * | 7/2003 | Van Asma et al. .......... 348/458 |
| 2003/0128896 A1 * | 7/2003 | Nacman et al. ............. 382/300 |
| 2003/0174148 A1 * | 9/2003 | Chia et al. ................... 345/660 |
| 2003/0218774 A1 * | 11/2003 | Masaki ...................... 358/1.16 |
| 2004/0021790 A1 * | 2/2004 | Iga ........................ 348/333.12 |

FOREIGN PATENT DOCUMENTS

JP    2000148997 A  *  5/2000

* cited by examiner

*Primary Examiner*—Michael Razavi
*Assistant Examiner*—Eric Woods
(74) *Attorney, Agent, or Firm*—Winston Hsu

(57) ABSTRACT

A method for scaling a digital picture to generate a scaled picture including following steps:(a) scaling a portion of the digital picture instead of the whole digital picture in a first direction; (b) scaling part of the data produced in step (a) in a second direction; and (c) repeating steps (a) and (b) to form the scaled picture.

6 Claims, 7 Drawing Sheets

DIGITAL PICTURE SCALING

BACKGROUND OF INVENTION

1. Field of the Invention

The present invention relates to scaling digital pictures, and more particularly, to scaling digital pictures with reduced memory usage.

2. Description of the Prior Art

In practice, scaling digital pictures is usually performed for still images or video frames to fit a specific application. The conventional method to scale a picture is to scale its horizontal dimension (width) first and then its vertical dimension (height), or vice versa. This requires a large buffer memory to store the results of scaling the horizontal dimension.

Please refer to FIG. 1 and FIG. 2. FIG. 1 is a schematic diagram of an up-scaling process according to the prior art, and FIG. 2 is a schematic diagram of a down-scaling process according to the prior art. $W_{old}$ and $H_{old}$ are the old width and height; $W_{new}$ and $H_{new}$ are the new width and new height; SRC is a memory for storing a source picture; DST is a memory for storing a scaled picture; and BUFFER is a memory for temporarily storing data during the scaling process. The method for performing a scaling process is to use the sampling formula at a new sampling point as Eq. 1.

$$x(t) = \sum_{n=-i}^{j} x(n)h(t-n) \quad (\text{Eq. 1})$$

Where x(t) is the new pixel value at the new sampling point t from n=0, x(n) is the original pixel value at index n, and h(t−n) is the value of an interpolation function shifted by t from index n. Furthermore, the coefficients i and j give the number of original pixels involved in reconstructing x(t), i.e. the number of original pixels involved is given by (i+j+1). As a result, based on Eq. 1, the scaling process can be realized by a filter-bank implementation. The number (i+j+1) gives the number of filter taps and h(n) is the tap weighting at n. The sampling process and the theory behind it are well known by those in the art, and accordingly it will not be discussed in detail here.

Ideally, a large buffer memory provides the freedom for a scaling process to exploit filters of any length to achieve the required scaling quality. That is, the size of the buffer memory required is ($W_{new}*H_{old}$) bytes. However, from FIG. 1 and FIG. 2, the problem is when up-scaling the input picture the memory required increases dramatically. For example, if a picture is to be scaled to be two times larger in each dimension, the buffer memory required becomes ($W_{new}*H_{old}$)=($2*W_{old}*H_{old}$). This high memory requirement is not feasible in some applications. In particular, this high memory requirement is not suitable for hardware implementation by integrated circuits (ICs).

SUMMARY OF INVENTION

It is therefore a primary objective of the claimed invention to provide a method for scaling a digital picture with reduced memory to solve the above-mentioned problem.

According to the claimed invention, a method for scaling a digital picture comprising following steps: (a) inputting a source picture to a source memory; (b) providing a first buffer and a second buffer; (c) determining scaling factors; (d) generating initial data in the first buffer and second buffer; (e) transferring a portion data of the digital picture from the source memory to the first buffer; (f) using a filter to scale the data in the first buffer in a first direction and storing the scaled data in the second buffer; (g) using the filter to scale the data in the second buffer in a second direction and storing the scaled data in a destination memory; and (h) outputting a scaled picture from the destination memory.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
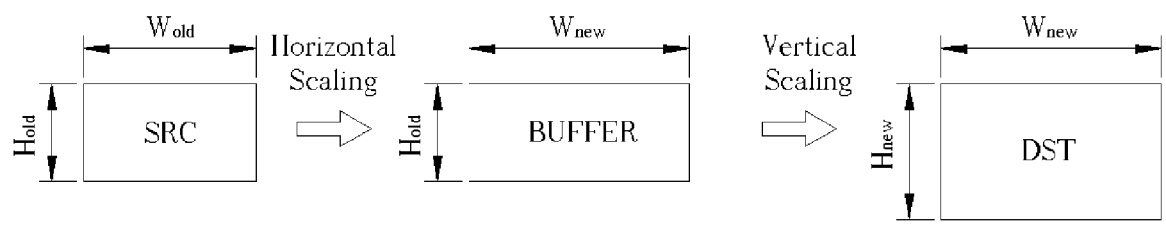
FIG. 1 is a schematic diagram of an up-scaling process according to the prior art.
Figure 2:
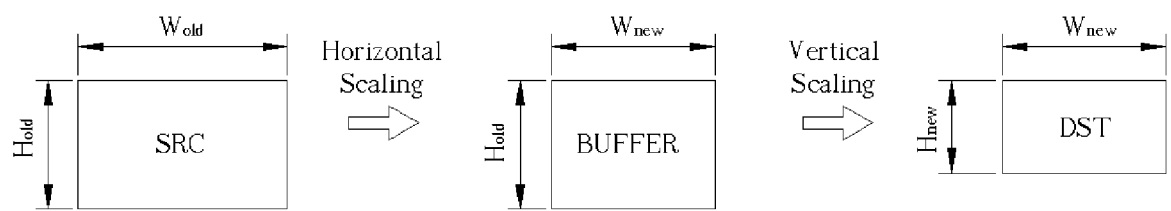
FIG. 2 is a schematic diagram of a down-scaling process according to the prior art.
Figure 3:
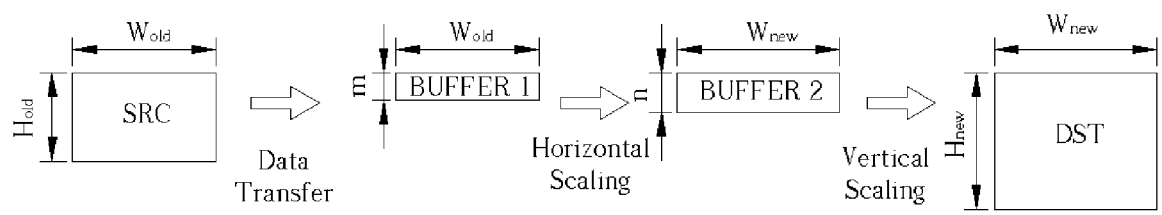
FIG. 3 is a schematic diagram of an up-scaling process according to the present invention.
Figure 4:
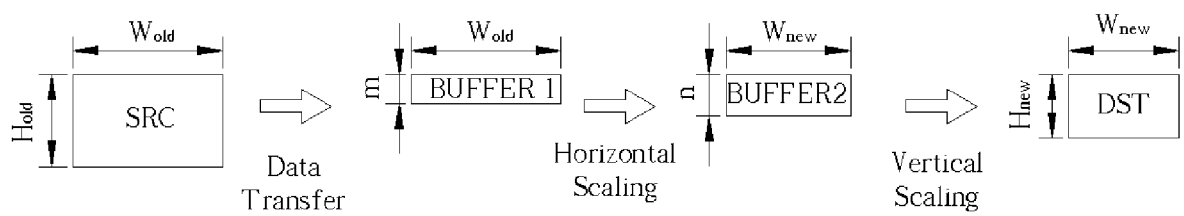
FIG. 4 is a schematic diagram of a down-scaling process according to the present invention.

Please refer to FIG. 3 and FIG. 4. FIG. 3 is a schematic diagram of an up-scaling process according to the present invention, and FIG. 4 is a schematic diagram of a down-scaling process according to the present invention, where SRC is a memory for storing a source picture, and DST is a memory for storing a scaled picture. The size of the first line-buffer BUFFER1 is ($m*W_{old}$) bytes and the size of the second-buffer BUFFER2 is ($n*W_{new}$) bytes, where m and n are the number of lines for the first and second buffers and depend on the length of the filter used. That is, if the length of the interpolation filter is L, then m=L and n=(2*L−1). Furthermore, the function of the buffer BUFFER1 is to store data needed for horizontal scaling as well as to store the decimated picture data. The BUFFER1 is not necessary if the source picture can be randomly accused from the memory SRC. On the other hand, the function of the BUFFER2 is to store the horizontally scaled results as well as to organize the data for vertical scaling.

Figure 5:
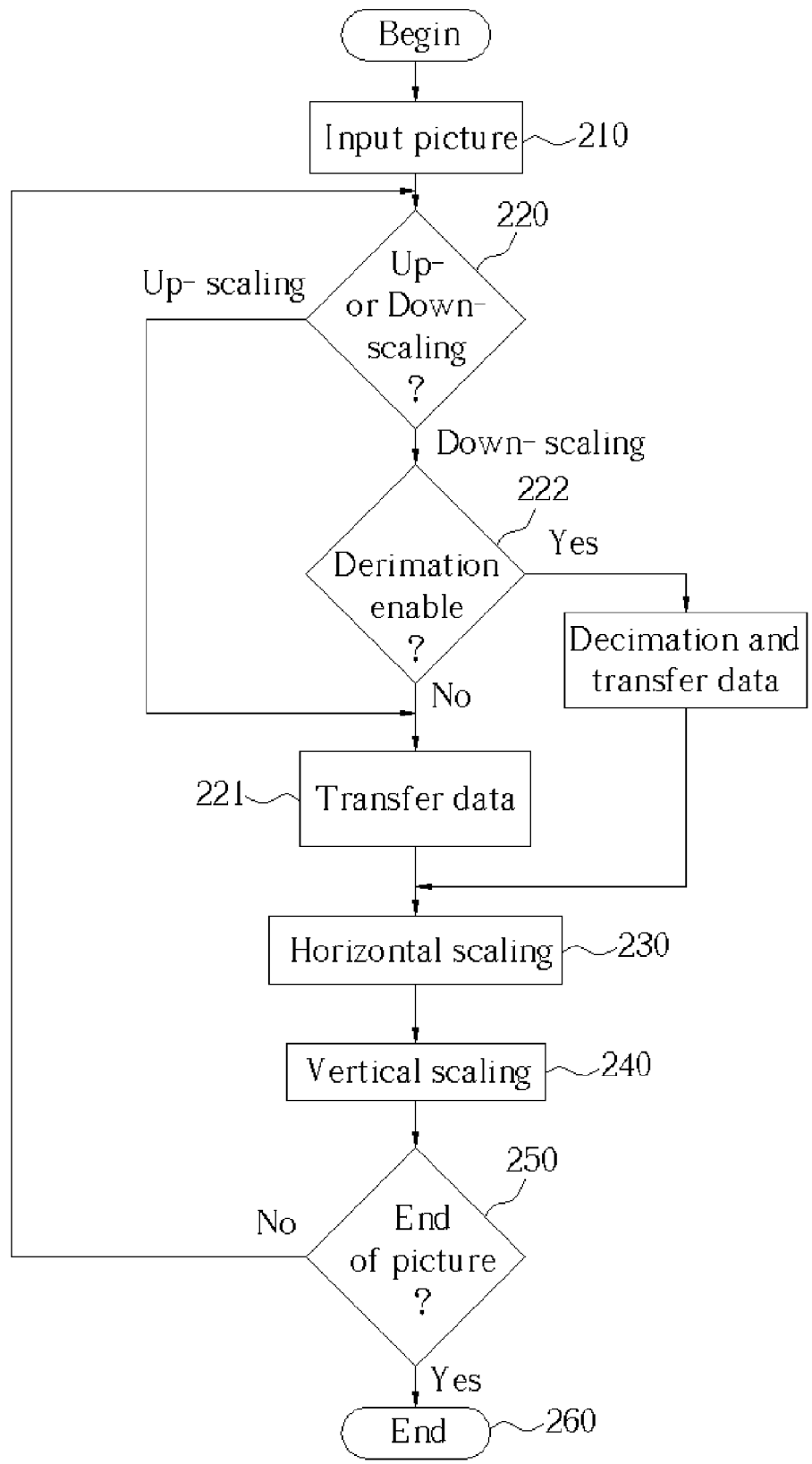
FIG. 5 is a flowchart according to the present invention.

Please refer to FIG. 5. FIG. 5 is a flowchart according to the present invention. In step 210, the picture to be scaled is inputted and stored in the memory SRC. In step 220, the scaling operation for the picture is determined as being up-scaling or down-scaling. If the picture is to be up-scaled, during step 221, rows of picture data are transferred to the buffer BUFFER1. If the picture is to be down-scaled, during step 222, the data decimation operation is determined. If the decimation operation is enabled, rows of the picture data are decimated when necessary and transferred to the buffer BUFFER1. Otherwise, rows of picture data are transferred to the buffer BUFFER1. In step 230, the horizontal scaling process is performed and the results are stored in the buffer BUFFER2. In step 240, the vertical scaling process is performed and the results are outputted to the memory DST. In step 250, if the picture has data remaining to be scaled, repeat step 220 to step 240 until all rows of the picture data have been horizontally and vertically scaled. Finally, the step 260 is executed to finish the scaling process.

Figure 6:
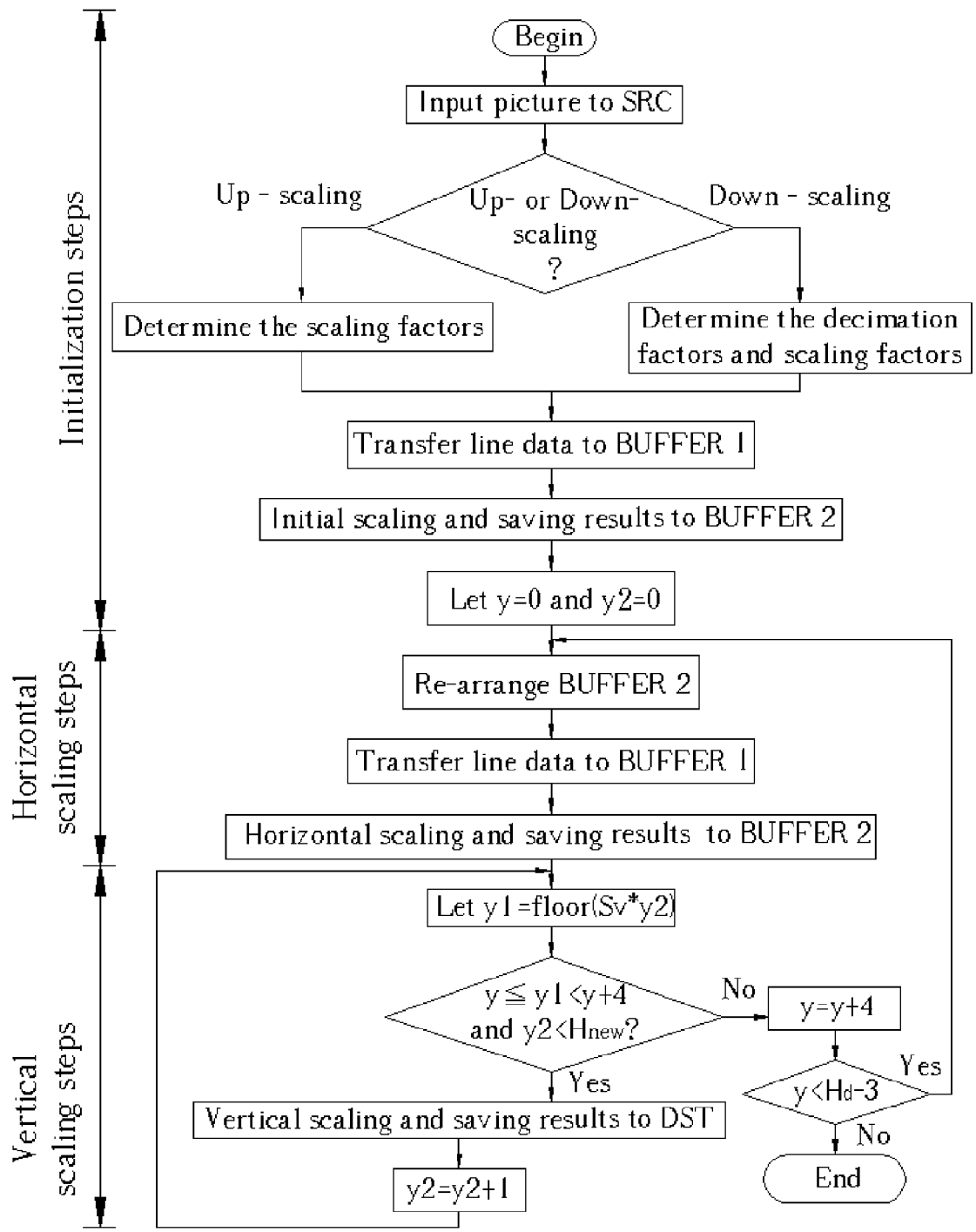
FIG. 6 is a flowchart of a preferred embodiment according to the present invention.

Please refer to FIG. 6. FIG. 6 is a flowchart of a preferred embodiment according to the present invention. For clearly explaining the spirit of this invention, the preferred embodiment of this invention exploits a 4-tap interpolation filter to perform the scaling process. Furthermore, the up-scaling ratio is assumed to be up to twice as large as the original picture in each dimension, but the down-scaling ratio is not limited. Therefore, the size of the buffer BUFFER1 is $4*W_{old}$ bytes and the size of the buffer BUFFER2 is $7*W_{new}=14*W_{old}$ bytes, as $W_{new}=2*W_{old}$. For conveniently explaining the processing steps in the flowchart, the whole process can be divided into three groups, namely the initialization steps, horizontal scaling steps, and vertical scaling steps.

In the group of initialization steps, the picture to be scaled is firstly inputted and stored in the memory SRC. After that, the scaling factors and the decimation factors are determined. Initially, the horizontal and vertical scaling factors are respectively given by $S_h=W_{old}/W_{new}$ and $S_v=H_{old}/H_{new}$, where $W_{old}$ and $H_{old}$ are respectively the width and height of the input picture, and $W_{new}$ and $H_{new}$ are respectively the width and height to be scaled to. The initial horizontal scaling factor $S_h$ determines whether the picture data will be decimated in the horizontal direction being transferred to the buffer BUFFER1. That is, if the decimation operation is enabled and $S_h>2$, then picture data is decimated horizontally according to the horizontal decimation factor $d_h=\text{floor}(\log_2 S_h)$, where the floor function truncates the decimal portions; otherwise, no horizontal data decimation will be performed and set $d_h=0$. Similarly, the initial vertical scaling factor Sv determines whether the picture data will be decimated in the vertical direction before being transferred to the buffer BUFFER1. That is, if the decimation is enabled and $S_v>2$, then picture data is decimated vertically according to the vertical decimation factor $d_v=\text{floor}(\log_2 S_v)$; otherwise, no vertical data decimation will be performed and set $d_v=0$. As a result, according to the picture decimation process, the data in the memory BUFFER1 and the memory SRC can be generally expressed as:

$$\text{BUFFER1}(x,i)=SRC(2^{dh}*x, 2^{dv}*(y+i)),$$

where x ranges from 0 to ($W_{old}-1$), y ranges from 0 to ($H_{old}-1$) and i ranges from 0 to 3.

Since after decimation the width and height of the input picture will become $W_d=W_{old}/d_h$ and $H_d=H_{old}/d_v$, the actual scaling factors used in the scaling process are referred to as $S_h=W_d/W_{new}$ and $S_v=H_d/H_{new}$. After determining the decimation and scaling factor, the initial horizontal scaling process is performed. In this process, two lines of SRC data are transferred to the buffer BUFFER1, such as:

$$\text{BUFFER1}(x,0)=SRC(2^{dh}*x,0),$$

$$\text{BUFFER1}(x,1)=SRC(2^{dh}*x,2^{dv}),$$

where x ranges from 0 to ($W_d-1$).

Based on Eq. 1, the initial horizontal scaling process on these two lines of data becomes:

$$\text{BUFFER2}(x2,5) = \sum_{n=-1}^{2} \text{BUFFER1}(x1+n, 0)*w(n).$$

and $$\text{BUFFER2}(x2,6) = \sum_{n=-1}^{2} \text{BUFFER1}(x1+n, 1)*w(n)$$

where x2 ranges from 0 to ($W_{new}-1$) and $x1=\text{floor}(S_h*x2)$, which neglects fractional portions. The result of the initial horizontal scaling from row0 and row1 of the buffer BUFFER1 is respectively stored in row5 and row6 of the buffer BUFFER2. The practical implementation of the scaling process and the method of obtaining w(n) are clear to those skilled in the art and will not be discussed here. However, one thing that should be mentioned is that the boundary conditions are treated as a mirror-extension process.

Figure 7:
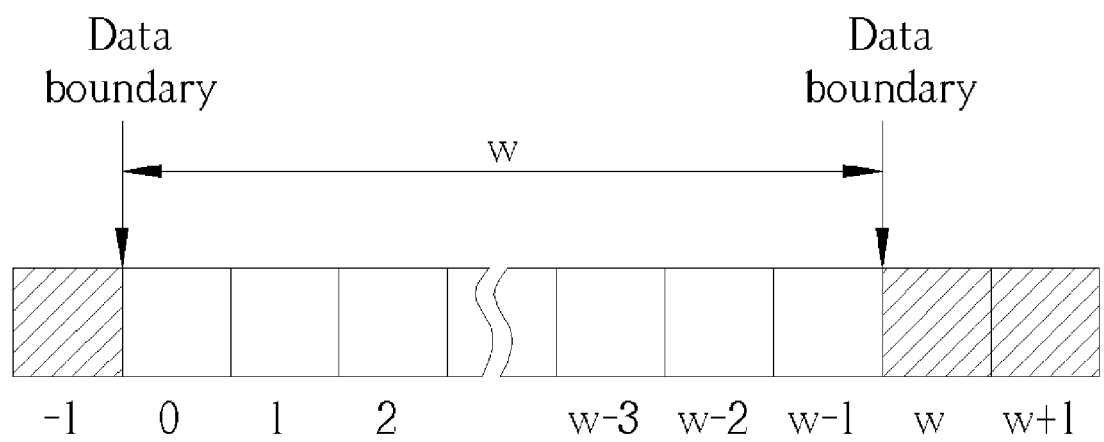
FIG. 7 is a schematic diagram of mirrored data extension.

Please refer to FIG. 7. FIG. 7 is a schematic diagram of mirrored data extension. There are two options, and each option uses one row of the buffer BUFFER1 with the width of W as an example.

In option 1:

BUFFER1(-1)=BUFFER1(0),

BUFFER1($W$)=BUFFER1($W$-1), and

BUFFER1($W$+1)=BUFFER1($W$-2).

In option 2:

BUFFER1(-1)=BUFFER1(0),

BUFFER1($W$)=BUFFER1($W$-1), and

BUFFER1($W$+1)=BUFFER2($W$-2).

Finally, in the last step of the initialization steps, the vertical index pointers y and y2 are both set to 0, where y is the vertical index counter for the memory SRC and y2 is the vertical index counter for the memory DST. The functions of pointers y and y2 will be clear in the following discussion.

In the group of the horizontal scaling steps, the first step is to re-arrange the buffer BUFFER2 as follows:

BUFFER2(x2,0)=BUFFER2(x2,5) if $y=0$,

BUFFER2(x2,0)=BUFFER2(x2,4) if $y\neq 0$,

BUFFER2(x2,1)=BUFFER2(x2,5)

BUFFER2(x2,2)=BUFFER2(x2,6)

BUFFER2(x2,5)=BUFFER2(x2,4) if $y\geq(H_d-7)$,

BUFFER2(x2,5)=BUFFER2(x2,3) if $y\geq(H_d-7)$, where x2 ranges from 0 to ($W_{new}-1$).

After that, more rows of picture data are transferred from the SRC to the buffer BUFFER1, such as:

BUFFER1(x,0)=$SRC(2^{dn}*x,2^{dv}(y+2))$,

BUFFER1(x,1)=$SRC(2^{dn}*x,2^{dv}(y+3))$, and if $y<(H_d-7)$, then

BUFFER1(x,2)=$SRC(2^{dn}*x,2^{dv}(y+4))$,

BUFFER1(x,3)=$SRC(2^{dn}*x,2^{dv}(y+5))$, where x ranges from 0 to ($W_d$−1).

The horizontal scaling process is given as follows:

$$BUFFER2(x2, 3) = \sum_{n=-1}^{2} BUFFER1(x1+n, 0) * w(n),$$

and $$BUFFER2(x2, 4) = \sum_{n=-1}^{2} BUFFER1(x1+n, 1) * w(n);$$

and if y<($H_d$−7), then $$BUFFER2(x2, 5) = \sum_{n=-1}^{2} BUFFER1(x1+n, 2) * w(n),$$

and $$BUFFER2(x2, 6) = \sum_{n=-1}^{2} BUFFER1(x1+n, 3) * w(n),$$

where x2 ranges from 0 to ($W_{new}$−1) and x1=floor($S_h$*x2). That is, the horizontal scaling results from row0 and row1 of the buffer BUFFER1 are saved to row3 and row4 of the buffer BUFFER2, respectively. Also, if y is smaller than ($H_d$−7), then the scaling results from row2 and row3 of the buffer BUFFER1 are saved to row5 and row6 of the buffer BUFFER2.

In the group of vertical scaling steps, the first step is to let y1=floor($S_v$*y2). After that, if y1 satisfies y≦y1<(y+4) and y2 satisfies y2<$H_{new}$, then the vertical scaling process is performed as follows:

$$DST(x2, y2) = \sum_{n=-1}^{2} BUFFER2(x2, y1+n) * w(n),$$

where x2 ranges from 0 to ($W_{new}$−1). After the vertical scaling process, the vertical index pointer y2 is incremented by 1, i.e. y2=y2+1. Finally, the process returns to the first step of the vertical scaling steps. On the other hand, if y1 does not satisfy y≦y1<(y+4) or y2 does not satisfy y2<$H_{new}$, then the vertical index pointer y is increased by 4, i.e. y=y+4. After that, the range of y is verified; if y is smaller than ($H_d$−3), then the entire scaling process begins again from the first step of the horizontal scaling process. Otherwise, the scaling procedure has been accomplished and all processes are terminated.

In contrast to the prior art, the present invention a line-buffer scaling method that enables horizontal-scaling and vertical-scaling processes to use the same number of filter taps for achieving the best possible quality, while the buffer memory requirement is kept to be as small as possible and is proportional to the filter length. Therefore, this low-memory scaling method is suitable for the case when system memory available is constrained.

Those skilled in the art will readily observe that numerous modifications and alterations of the device may be made while retaining the teachings of the invention. Accordingly, the above disclosure should be construed as limited only by the metes and bounds of the appended claims.

The invention claimed is:

1. A method for scaling a digital picture comprising the following steps:
    (a) inputting a source picture to a source memory;
    (b) providing a first buffer and a second buffer;
    (c) determining scaling factors;
    (d) generating initial data in the first buffer and second buffer;
    (e) transferring a portion of data of the digital picture from the source memory to the first buffer, the portion of data having a size in a second direction of L and size in a first direction equal to a corresponding size of the source picture;
    (f) using an L-tap filter to scale the data in the first buffer in the first direction and storing the scaled data in the second buffer;
    (g) using the L-tap filter to scale the data in the second buffer in the second direction and storing the scaled data in a destination memory, the scaled data having a size in the first direction of 2*L−1;
    (h) for each different portion of data in sequence, repeating steps (e) through (g) to form a scaled picture; and
    (i) outputting the scaled picture from the destination memory.

2. The method of claim 1 wherein the first direction is a horizontal direction, and the second direction is a vertical direction.

3. The method of claim 1 wherein the first direction is a vertical direction, and the second direction is a horizontal direction.

4. The method of claim 1 wherein step (d) comprises applying a mirror boundary condition to the first buffer and filtering initial data in the first buffer to produce the initial data in the second buffer.

5. The method of claim 1 further comprising before scaling a last portion of the digital picture in the second direction, applying a mirror boundary condition to part of the digital picture scaled in step (f).

6. The method of claim 1 further wherein step (e) comprises omitting transfer of part of the digital picture for down-scaling.

* * * * *